July 12, 1955  C. N. BRUNS  2,713,017
WELDING PLASTIC FILM SECTIONS
Filed July 12, 1954
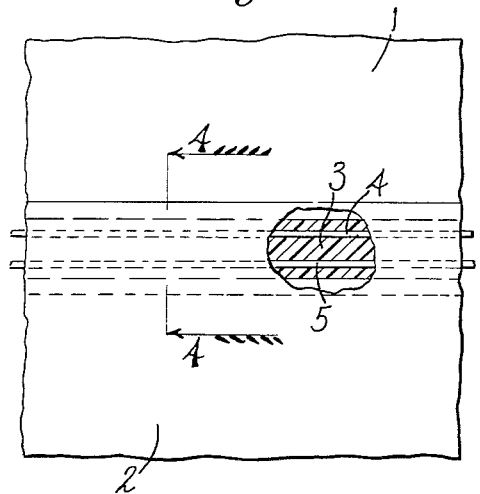
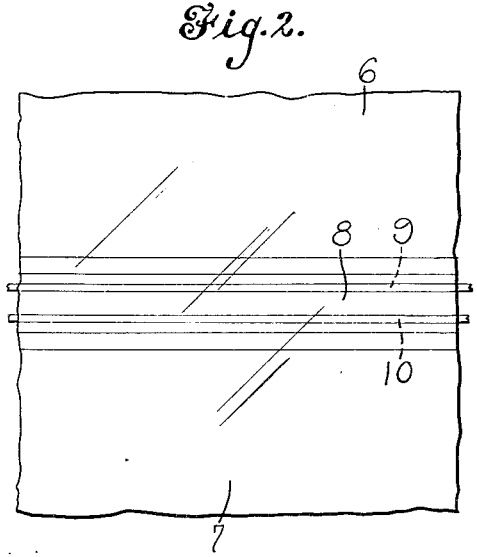
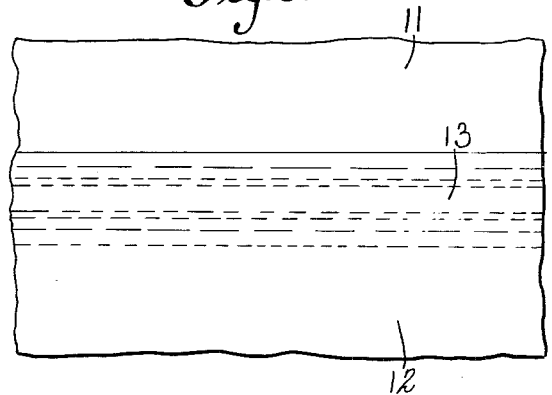
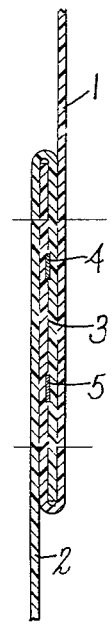
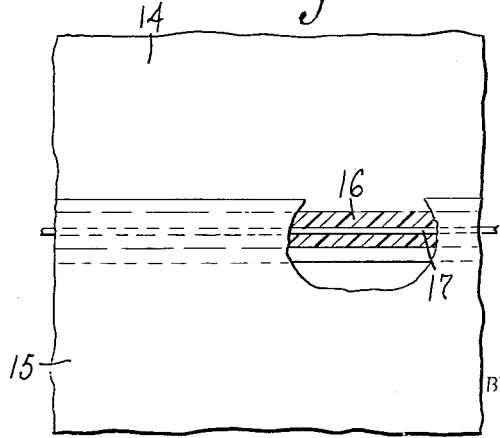
INVENTOR
Carl N. Bruns
BY *Rockwell & Batchelor*
ATTORNEYS

United States Patent Office 2,713,017
Patented July 12, 1955

2,713,017

WELDING PLASTIC FILM SECTIONS

Carl N. Bruns, Branford, Conn., assignor to The Connecticut Hard Rubber Company, New Haven, Conn., a corporation of Connecticut Application July 12, 1954, Serial No. 442,810

17 Claims. (Cl. 154—126)

This invention relates to a novel method of joining thermoplastic bodies such as sheets, tubes and irregularly shaped objects to produce a strong bond between the sections being joined. Substantial problems arise in the welding or seaming of plastic materials including vinyl chloride polyethylene and other thermoplastic or heat-softenable materials.

Various applications have been found for plastic sheets or bags formed of polytetrafluoroethylene and polytrifluorochloroethylene plastics and particularly where temperature and chemical-resistant properties are required.

For example, it has been proposed to form containers or liners of highly chemical-resistant polytetrafluoroethylene and polytrifluorochloroethylene, and the fabrication of such containers or liners of necessity includes the establishment of gas and fluid-resistant seams where the adjoining edges of the material are strongly and permanently joined into an integral structure. The primary object of the present invention is to provide a novel method for seaming and sealing adjacent edges of polytetrafluoroethylene and polytrifluorochloroethylene plastic films and laminates.

Heretofore, plastics have been welded by induction heating wherein heat is induced internally in the plastic material by a high-frequency electric field. This requires elaborate equipment and is restricted in application to plastic materials having special characteristics.

Plastic bodies and films of polytetrafluoroethylene plastic are available commercially by E. I. Du Pont under the trade-mark "Teflon" and plastic bodies and films of polytrifluorochloroethylene are marketed by M. W. Kellogg under the trademark "Kel-F." The latter material is also available from Bakelite Corporation under the name "Fluorethene."

According to the present invention, films, bodies and laminates or the like of thermoplastic materials such as polytetrafluoroethylene and polytrifluorochloroethylene plastics are welded, seamed together, or joined at the abutting portions or points of contact by means of conducting metal elements disposed between or adjacent to the adjoining surfaces.

In a preferred embodiment of the invention, a metal wire or ribbon is inserted between the mating surfaces longitudinally within the seam, and electric current or impulses pass through the metal electric conductors to melt the adjacent edges of the bodies into an integral structure. In such a procedure, the mating surfaces must be in contact and preferably be supported between underlying sections of soft resistant material such as temperature-resistant sponge rubber before heat is applied to cause the plastics to flow together at the point of contact. In certain cases, this is important since a satisfactory weld cannot usually be effected before a substantially fluid state is obtained between the adjoining members at the point of contact. Ordinarily, slight pressure is sufficient to integrate the members during the fusion period.

According to one embodiment of the invention, "Teflon," "Kel-F" or other plastic fusible films are reversely folded to form marginal portions which are then interlocked, and a length of the electrical conductive wire is doubled and inserted between the second and third layers of the folded material along the resulting seam. The wire-loaded and seamed film may then be placed between pliable resilient holding members such as silicone sponge rubber or the like, thereby providing a supporting pressure on opposite sides of the seam being welded. A low voltage current is then passed through the doubled wire conductor for a brief period, whereupon the seam is removed from the supporting members and immediately quenched in cold water to chill the structure. During passage of the current through the wire, the heat developed in the longitudinal area of the seam is sufficient to flow together the superimposed layers of plastic between the resistance wires forming an integral structure.

The seam resulting from this treatment involving the joining of polytetrafluoroethylene or polytrifluorochloroethylene, is completely gas and liquid-tight and is at least as strong as the adjacent untreated surfaces of the plastic materials.

It was found that the foregoing treatment produces no distortion or irregularities along the entire longitudinal length of the welded seam, thereby providing a distinctive improvement. Moreover, a particular advantage of the method is that it can be applied to the seaming of any edge desired to be joined or seamed in irregularly shaped objects such as containers, bags, liners, and the like.

The resistance wire employed in forming the welded seam can either be left in place along the welded portions of the seam or removed completely. Lubricant may be initially applied to the resistance wire to facilitate its ready removal from the joined edges, although, in most cases, including Teflon this is unnecessary. Particular advantages are found in allowing the wire to remain an integral portion of the seam since the seam is thereby strengthened, and the possibility of the film portions along adjacent areas of the seam of becoming stretched or assuming an irregular shape is thereby eliminated since most of the strain at the joint is absorbed; moreover, the covered wire may be utilized as a method of preheating the contents of tanks, interior of ducts, pipes, or the like, or used as a ground wire in specialized applications.

In certain cases, the adjoining edges of the sections of film to be welded may simply be overlapped and a single strand of resistance wire placed between the overlapping sections of the film. As before, the resulting structure is placed between resilient supporting members and slight pressure applied across the seam to urge the mating sections of the plastic into close relationship during the passage of current through the wire.

The drawings illustrate typical applications of the invention for joining sections of plastic film in integral relationship.

Fig. 1 is a plan view of joined "Kel-F" sheets partly broken away at the seam;

Fig. 2 is a view similar to that shown in Fig. 1 showing joined "Teflon" sheets;

Fig. 3 illustrates "Kel-F" sheets integrated along the seam with the resistance wires removed;

Fig. 4 is a sectional view on line 4—4 of Fig. 1; and

Fig. 5 is a seam welded by using a single resistance wire.

Referring to Figs. 1 and 4 of the drawings, it will be observed that "Kel-F" sections 1 and 2 are reversely folded and interlocked and a resistance wire such as nickel chrome 4, 5 inserted between the center folds of the seam, as illustrated particularly in Fig. 4. The resistance wire is reversely bent and the passage of electric current results in an integrated section 3 between resistance wires 4 and 5. In this area, the fourth thicknesses of film are melted into an integral seam by the passage of the electrical current through the nickel chrome wire.

Fig. 2 shows sections 6 and 7 of "Teflon" polytetrafluoroethylene joined together into a cohesive integral seam 8 in a similar manner to that just described in regard to Figs. 1 and 4. Fig. 3 illustrates the joining of "Kel-F," "Teflon," or other plastic film sections by means of resistance wires in a fashion similar to that described in Figs. 1, 2 and 4, wherein the resistance wires are withdrawn from the welded area and after establishment of the seam.

In Fig. 5 sections 14 and 15 of "Kel-F" are merely overlapped with respect to a single strand resistance wire 17, and the application of current creates a weld area between the adjoining areas immediately adjacent to the hot resistance wire.

The following examples illustrate specialized applications of the invention in the welding of "Kel-F" and "Teflon" films.

Example 1

Two pieces of Kel-F unplasticized film .006 inch thick and five inches square were cut and one side of each square was folded over to a depth of ½ inch. The squares were then folded together to make a continuous ½ inch seam, five inches long, having four layers of film. A length of 1/16 by .004 inch flat nickel chrome wire having a resistance of 2.56 ohms per foot, and 2½ feet long, bent double, was inserted between the second and third layers of film at the seam. The wire-loaded seamed film was then covered on both sides by .006 inch Teflon film, and, in turn, sandwiched between two six inch squares of ½ inch silicone rubber sponge. A 15 lb. steel weight was obtained, this having a bearing surface on the film side of five square inches, and positioned on the upper layer of sponge rubber directly over the seam. This arrangement put a supporting pressure on the Kel-F film amounting to three pounds per square inch. The powerstat and voltmeter were then connected to the ends of the chrome wire and the seam sealed with 20 volts over a four minute period. This was immediately followed by quenching the nearly fluid seam in cold tap water and removing the Teflon.

A particular advantage of the foregoing procedure is that heat is concentrated at the interfacing surfaces of the weld, thereby avoiding distortion due to overheating, where, in previous procedures, heat was applied to the exterior surfaces. During this procedure, the heat is distributed evenly along the seam to provide a uniform seal throughout the weld area. This cannot be conveniently effected by the customary methods of welding plastic.

Example 2

Two pieces of Teflon film having a thickness of .008 inch, three feet long, and four feet wide were overlapped along the edges to be joined to the extent of ½ inch with a nickel chrome wire interposed. Rubber cushions were placed on opposite sides of the seam and slight pressure applied during the passage of current therethrough. After a period of five minutes, the heat was discontinued and it was observed that the sections were firmly joined by a weld area along the sides of the resistance wire.

Example 3

Two pieces of Teflon film .006 inch by five inches were cut out and one side of each square was folded back to a depth of ½ inch. The squares were then folded together to make a continuous ½ inch seam five inches long having five layers of film in a lapped joint. A length of 1/16 by .004 inch flat nickel chrome wire 2½ feet long and bent double, with a ¼ inch space between edges and parallel to the length, was inserted between the second and third layers of film in the seam. The wire-loaded, seamed film was sandwiched between two layers of ½ inch silicone sponge, following which a 15 lb. weight was positioned on top of the sponge. The film area supported by the sponge amounted to five square inches; hence, pressure applied was three pounds per square inch. The powerstat and voltmeter were then connected to the ends of the wire and the seam sealed with 22 volts over a seven minute period. The same procedure was used for thicknesses of .006 and .010 inch, although the seal was more uniform in the greater thickness material when the wire edges were separated by only 3/16 inch rather than ¼ inch, indicating the use of heavier wire with increases of film thickness. Sealing was immediately followed by quenching in cold tap water, which preserves flexibility and keeps distortion to a minimum in addition to minimizing crystallization, or the like.

After sealing, the wire can be pulled out if necessary, or left in the seam as desired.

The method is applicable to both plasticized and unplasticized plastic compositions. Furthermore, current flow through the resistance wires can easily be created by inductance, if desired, with comparable results. Other means of heating the embedded wire, such as magnetic flux, or absorption of infrared irradiation, may also be used.

It will be appreciated that the methods described earlier as merely applications and utilities for the specific examples, are given herein as being illustrative and there is no intention of limiting the scope of the invention thereby.

What I claim is:

1. The method of seaming plastic film sections which comprises placing said film sections in overlapped relationship, inserting two electrical resistance wires in parallel spaced relation between the overlapped portions of film and applying electric current to the resistance wire to fuse and integrate the sections together along the seam.

2. The method of seaming plastic film sections which comprises placing said film sections in overlapped relationship with two electrical resistance wires in parallel spaced relation between the overlapped sections, applying electric current to the resistance wire to fuse and integrate the sections together along the seam and then withdrawing the wire from the seam area.

3. The method of seaming film sections of polytetrafluoroethylene which comprises placing said film sections in overlapped relationship with two electrical resistance wires in parallel spaced relation between the overlapped sections, applying electric current to the resistance wire to fuse and integrate the sections together along the seam.

4. The method of claim 3 wherein the resistance wire is withdrawn from the seam area after the sections are fused together.

5. The method of seaming film sections of polytrifluorochloroethylene which comprises placing said film sections in overlapped relationship with two electrical resistance wires in parallel spaced relation between the overlapped sections, applying electric current to the resistance wire to fuse and integrate the sections together along the seam.

6. The method set forth in claim 5 wherein the resistance wire is withdrawn from the seam area after the sections are fused together.

7. The method of seaming plastic film sections which comprises forming a reverse fold along each of the opposing edges to be seamed together and interlocking the sections together with an electrical resistance wire disposed between the interlocked sections, applying an electrical current to the resistance wire to fuse and integrate the sections together along the seam.

8. The method of seaming plastic film sections which comprises placing said film sections in overlapped relationship, inserting two electrical resistance wires in parallel spaced relation between the overlapped portions of the film, applying pressure to the opposite sides of the assembly and passing an electrical current through the wire to fuse and integrate the sections together.

9. The method of joining sections of polytetrafluoroethylene which comprises placing said sections of polytetrafluoroethylene in abutting relation with two electrical resistance wires in spaced parallel relation interposed between the sections at the area of junction, applying pressure to the opposite sides of the sections to be joined and applying electric current to the resistance wire to fuse and integrate the sections together.

10. The method set forth in claim 9 wherein the resistance wire is withdrawn from the area of juncture after the sections are fused together.

11. The method of joining sections of polytrifluorochloroethylene which comprises placing said sections of polytrifluorochloroethylene in abutting relation with two electrical resistance wires disposed in parallel relation interposed between the sections at the area of junction, applying pressure to the opposite sides of the sections to be joined and passing electric current through the resistance wire to fuse and integrate the sections together.

12. The method of seaming plastic film sections which comprises forming a reversely folded portion at the edge of each section being joined and interlocking the sections together, inserting between the middle fold of the seam area two resistance wires situated in parallel spaced relation and passing an electric current through said resistance wires to fuse the opposing sections of film and integrate the sections together.

13. The method set forth in claim 12 wherein the resistance wires are withdrawn from the seam after fusion.

14. The method set forth in claim 12 wherein resilient pressure is applied to the opposite sides of the seam during the passage of electric current through the resistance wires.

15. As an article of manufacture of thermoplastic sections joined in overlapping relation and integrated along the point of junction and two flexible conductive wires enclosed between said sections in parallel spaced relation along the area of integration.

16. The product of claim 15 wherein the thermoplastic is a polytetrafluoroethylene.

17. The product of claim 15 wherein the thermoplastic is a polytrifluorochloroethylene.

References Cited in the file of this patent

UNITED STATES PATENTS

| | | |
|---|---|---|
| 2,375,386 | Rick | May 8, 1945 |
| 2,640,798 | Langer | June 2, 1953 |
| 2,647,072 | Smith | July 28, 1953 |